United States Patent
Maeda et al.

(10) Patent No.: US 12,206,352 B2
(45) Date of Patent: Jan. 21, 2025

(54) ROTATION ANGLE DETECTING METHOD, RECORDING MEDIUM STORING ROTATION ANGLE DETECTING PROGRAM, AND ROTATION ANGLE DETECTING DEVICE

(71) Applicant: ALPS ALPINE CO., LTD., Tokyo (JP)

(72) Inventors: Ryo Maeda, Tokyo (JP); Ikuyasu Miyako, Miyagi (JP); Wataru Kimura, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 175 days.

(21) Appl. No.: 18/303,068

(22) Filed: Apr. 19, 2023

(65) Prior Publication Data
US 2023/0387839 A1 Nov. 30, 2023

(30) Foreign Application Priority Data
May 31, 2022 (JP) .................. 2022-089182

(51) Int. Cl.
*H02P 6/00* (2016.01)
*H02P 6/18* (2016.01)
*H02P 21/18* (2016.01)

(52) U.S. Cl.
CPC .............. *H02P 6/188* (2013.01); *H02P 21/18* (2016.02)

(58) Field of Classification Search
CPC .................................. H02P 6/188; H02P 21/18
See application file for complete search history.

(56) References Cited

FOREIGN PATENT DOCUMENTS

| DE | 102016200594 A1 * | 8/2016 | ............... G01D 5/12 |
| JP | 2016-069878 | 5/2016 | |

* cited by examiner

*Primary Examiner* — Karen Masih
(74) *Attorney, Agent, or Firm* — IPUSA, PLLC

(57) ABSTRACT

A rotation angle detecting method includes measuring a current flowing through a motor, and obtaining a rotation angle of the motor based on a value of the measured current. The obtaining of the rotation angle of the motor includes obtaining the rotation angle in an inertial rotation of the motor based on a rotational angular velocity of the motor immediately before a first time point, a time period from the first time point to a second time point, and a time period from the second time point to a third time point. The first time point is a time point at which driving of the motor is stopped, the second time point is a time point at which a polarity of the value of the measured current is inverted, and the third time point is a time point at which the value of the measured current becomes zero.

9 Claims, 7 Drawing Sheets

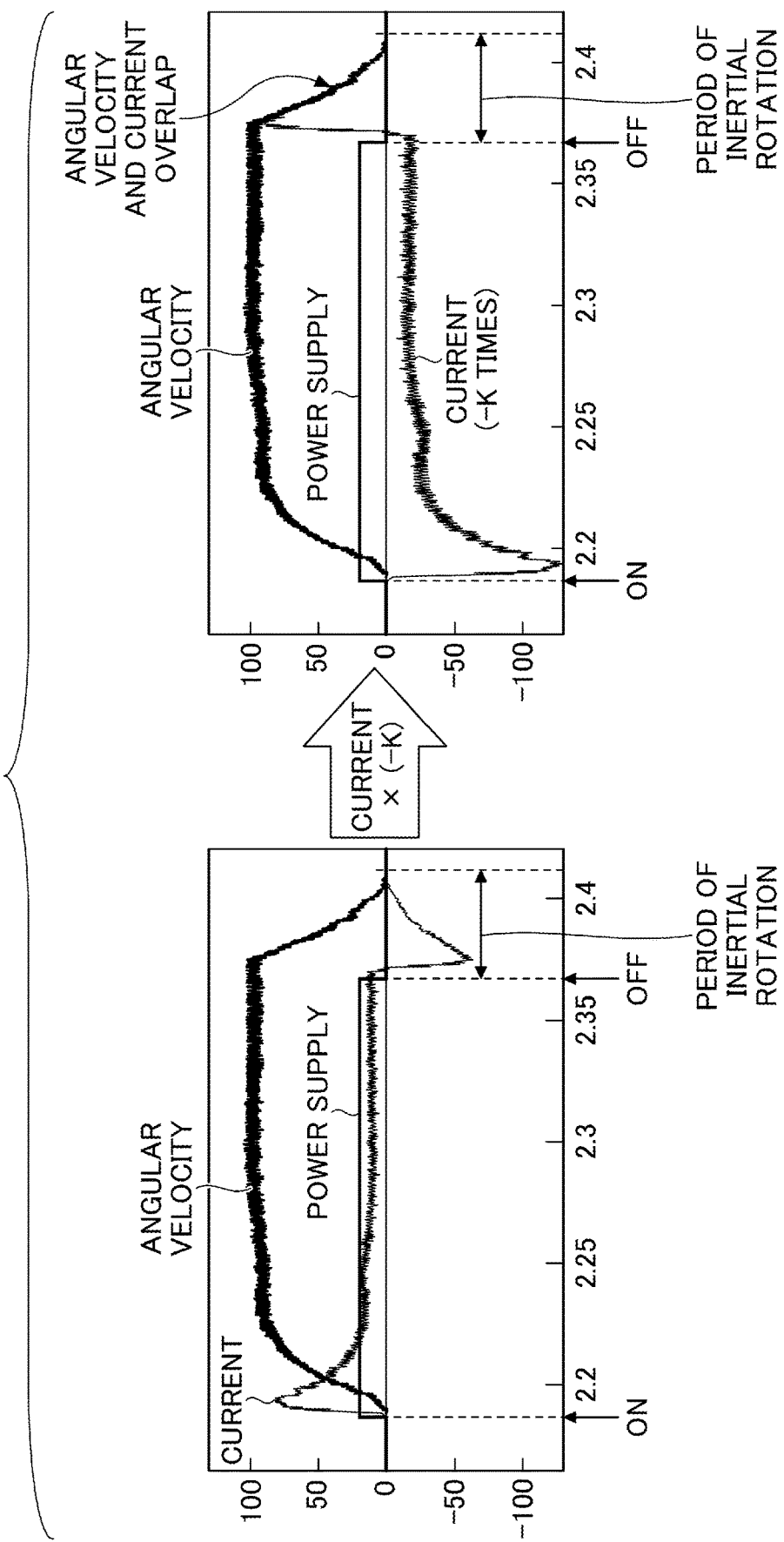

ROTATION ANGLE DETECTING METHOD, RECORDING MEDIUM STORING ROTATION ANGLE DETECTING PROGRAM, AND ROTATION ANGLE DETECTING DEVICE

CROSS-REFERENCE TO RELATED APPLICATION

This patent application is based on and claims priority to Japanese Patent Application No. 2022-089182 filed on May 31, 2022, the entire contents of which are incorporated herein by reference.

BACKGROUND OF THE INVENTION

1. Field of the Invention

The present disclosure relates to a rotation angle detecting method, a recording medium storing a rotation angle detecting program, and a rotation angle detecting device.

2. Description of the Related Art

A window position detecting device, including an operating switch for opening and closing operations of a motor for a power window that moves a window of a vehicle between a fully closed position and a fully opened position, a calculating unit configured to calculate the rotation amount of the motor based on the number of ripples of a driving current supplied from a power source to the motor based on the opening and closing operations of the operating switch, a counting unit configured to count the number of stops of the motor in response to a stop operation of the operating switch while the window moves in a close direction or an open direction between the fully opened position and the fully closed position, and a storage unit configured to store a correction amount preset based on the rotation amount of the motor due to an inertial force when the motor is stopped in response to the stop operation of the operating switch, is known. The window position detecting device includes an estimating unit configured to derive an estimated position of the window based on the rotation amount of the motor calculated by the calculating unit, the number of stops, and the correction amount, a detector configured to detect that the window moved by the motor has reached the fully closed position or the fully opened position, and a correcting unit configured to rewrite and correct the correction amount based on an error amount of the estimated position of the window derived by the estimating unit and the number of stops when the detector detects that the window has reached the fully closed position or the fully opened position (for example, see Patent Document 1).

RELATED-ART DOCUMENTS

Patent Document

Patent Document 1: Japanese Laid-Open Patent Application Publication No. 2016-069878

SUMMARY OF THE INVENTION

According to one aspect of an embodiment, a rotation angle detecting method includes measuring a current flowing through a motor, and obtaining a rotation angle of the motor based on a value of the measured current. The obtaining of the rotation angle of the motor includes obtaining the rotation angle in an inertial rotation of the motor based on a rotational angular velocity of the motor immediately before a first time point, a time period from the first time point to a second time point, and a time period from the second time point to a third time point. The first time point is a time point at which driving of the motor is stopped, the second time point is a time point at which a polarity of the value of the measured current is inverted, and the third time point is a time point at which the value of the measured current becomes zero.

BRIEF DESCRIPTION OF THE DRAWINGS

FIG. 3 is graphs indicating temporal changes in a current i and an angular velocity $\omega$ before and after the DC motor 10 is stopped;

DESCRIPTION OF THE PREFERRED EMBODIMENTS

While a window position detecting device in the related art can respond to a change in the rotation amount due to the inertial force (the rotation angle of the motor due to the inertial rotation), caused by aging, at the time of stopping the motor, the window position detecting device cannot respond to a change in the rotation angle of the motor due to inertial rotation caused by, for example, a change in the ease of opening and closing the window caused by a temperature difference between cold and warm temperatures. With respect to a battery, as the temperature decreases, an internal resistance of the battery increases and the output voltage decreases. When the driving voltage of the motor is low, the rotation speed becomes low and the rotation angle of the motor during the inertial rotation period becomes small. Thus, the rotation angle of the motor due to the inertial rotation cannot be accurately detected. Additionally, such a problem may similarly occur when an object other than a power window (a vehicle window) is driven by the motor.

A rotation angle detecting method, a rotation angle detecting program, and a rotation angle detecting device that can accurately detect the rotation angle of the motor even when the rotation angle of the motor due to the inertial rotation changes due to a change in ease of the rotation of the motor caused by a change in the temperature can be provided.

In the following, an embodiment, to which a rotation angle detecting method, a rotation angle detecting program, and a rotation angle detecting device of the present disclosure are applied, will be described.

EMBODIMENT

Figure 1:
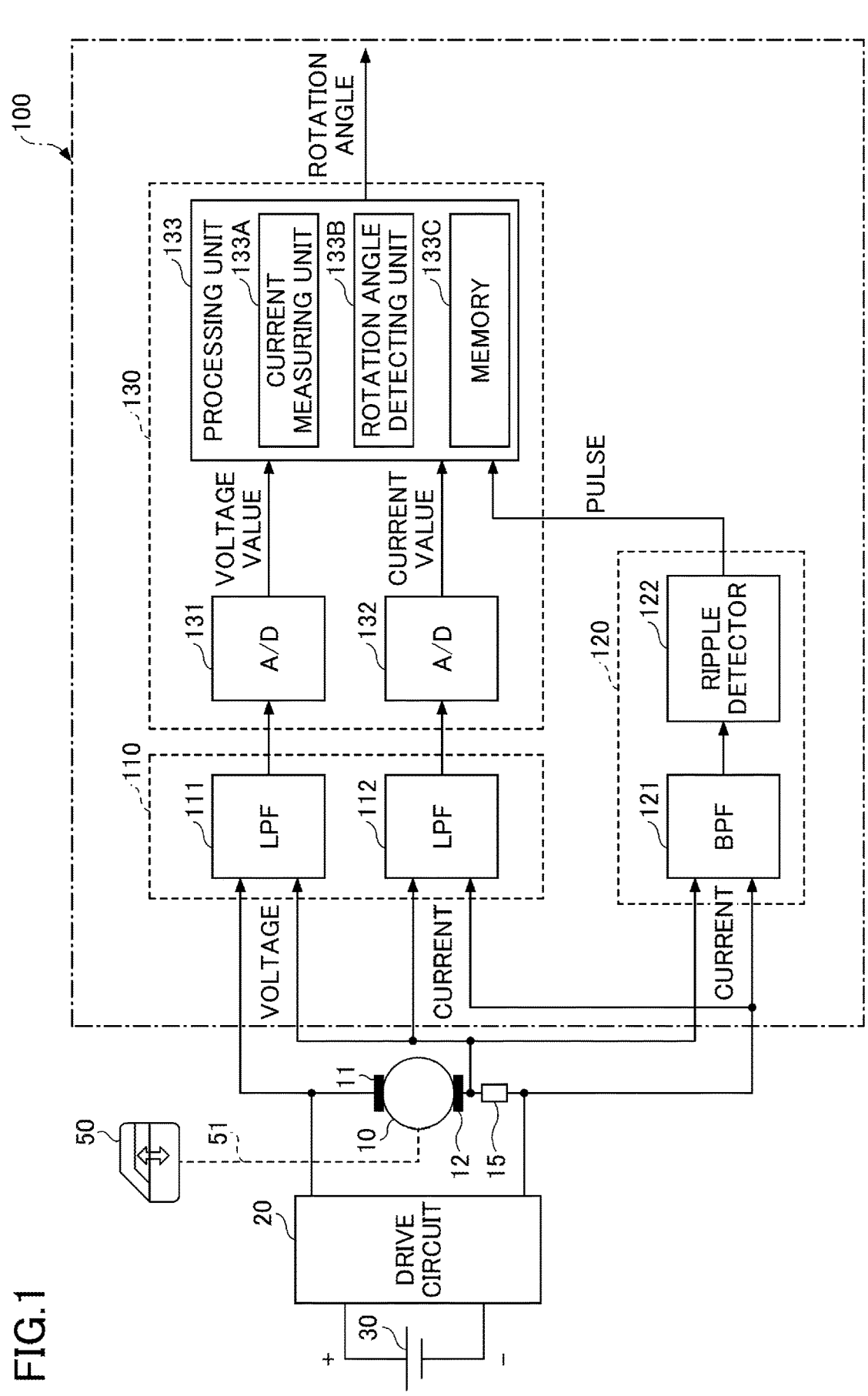
FIG. 1 is a diagram illustrating a rotation angle detecting device 100 according to an embodiment.

FIG. 1 is a diagram illustrating a rotation angle detecting device 100 according to an embodiment. An electric motor whose rotation angle is detected by the rotation angle detecting device 100 is not limited to an electric motor that drives a power window of a vehicle. Here, as an example, a form in which the rotation angle detecting device 100 of the embodiment is used as a rotation angle detecting device for the electric motor of the power window will be described.

FIG. 1 illustrates a direct current (DC) motor 10, a resistor 15, a drive circuit 20, a DC power supply 30, a power window 50, and a drive mechanism 51 in addition to the rotation angle detecting device 100.

The DC motor 10 includes terminals 11 and 12 and is driven by the drive circuit 20 connected to the terminals 11 and 12. The resistor 15 is connected to the terminal 12 of the DC motor 10 and is used to detect the current of the DC motor 10. The drive circuit 20 drives the DC motor 10 with the DC power supplied from the DC power supply 30. The drive circuit 20 is controlled by a drive controller (not illustrated) to drive the DC motor 10, but the drive controller is omitted here.

The power window 50 is a power window of a vehicle, and is a window glass that is opened and closed by a driving force transmitted from a rotor of the DC motor 10 via the drive mechanism 51. The drive mechanism 51 is provided inside a door panel of the vehicle or the like and is a mechanical mechanism such as a rack-and-pinion mechanism or a slider-crank mechanism that converts the rotational force of the rotor of the DC motor 10 into a driving force in the vertical direction of the power window 50.

The rotation angle detecting device 100 includes a filter circuit 110, an integrated circuit (IC) chip 120, and a microcomputer 130.

The filter circuit 110 includes low pass filters (LPFs) 111 and 112. The voltage between the terminals 11 and 12 of the motor 10 is input to the LPF 111, high-frequency noise and the like included in the voltage are removed, and the voltage is output to the microcomputer 130. The voltage between both ends of the resistor 15 is input to the LPF 112 as a voltage representing the current of the DC motor 10, high-frequency noise and the like included in the voltage are removed, and the voltage is output to the microcomputer 130.

The IC chip 120 includes a band pass filter (BPF) 121 and a ripple detector 122. Each time the rotor of the DC motor 10 rotates by a certain angle, a ripple occurs in the current flowing through the DC motor 10. The voltage between both ends of the resistor 15 is input to the BPF 121 as a voltage representing the current of the motor 10, and high-frequency noise, low-frequency noise, and the like included in the voltage are removed, and the voltage is output to the ripple detector 122. The ripple detector 122 is an example of a ripple detection processor, and performs ripple detection processing of detecting a ripple included in data representing the current input from the BPF 121, converts the ripple into a pulse, and outputs the pulse to the microcomputer 130.

The microcomputer 130 includes analog-to-digital (A/D) converters 131 and 132, and a processing unit 133. The microcomputer 130 is implemented by a computer including a central processor (CPU), a random access memory (RAM), a read only memory (ROM), an input/output interface, an internal bus, and the like. The processing unit 133 represents functions of programs executed by the microcomputer 130 as a functional block.

The A/D converter 131 converts the output of the LPF 111 into a digital signal and outputs the digital signal to the processing unit 133. The A/D converter 131 is an example of a voltage measuring processor, and performs voltage measurement processing of measuring the voltage of the signal output by the LPF 111. The output of the LPF 111 is a moving average of the voltage of the motor 10. The output of the A/D converter 131 is digital data representing the average voltage value of the DC motor 10.

The A/D converter 132 converts the output of the LPF 112 into a digital signal and outputs the digital signal to the processing unit 133. The output of the LPF 112 is a moving average of the current of the motor 10. The output of the A/D converter 132 is digital data representing the average current value of the DC motor 10.

The processing unit 133 includes a current measuring unit 133A, a rotation angle detecting unit 133B, and a memory 133C. The current measuring unit 133A and the rotation angle detecting unit 133B represent functions of programs executed by the microcomputer 130 as functional blocks. Additionally, the memory 133C represents the memory of the microcomputer 130 as a functional block.

The current measuring unit 133A performs a current measurement process of measuring a current flowing through the DC motor 10 based on the output of the A/D converter 132. The current measuring unit 133A outputs data representing the measured current value to the rotation angle detecting unit 133B.

The rotation angle detecting unit 133B performs rotation angle detection processing of obtaining a rotation angle in a time period of inertial rotation of the DC motor 10 based on the output (the voltage value) of the A/D converter 131, the output (the current value) of the current measuring unit 133A, and the pulse input from the ripple detector 122. The inertial rotation of the DC motor 10 indicates that, in a state in which the voltage is applied (electric power is supplied) from the drive circuit 20 to the DC motor 10 and the DC motor 10 is driven, the application of the voltage is stopped and then the rotor of the DC motor 10 rotates by inertia. The DC motor 10 rotates by inertia when the drive controller (not illustrated) controls the drive circuit 20 to stop the application of the voltage from the drive circuit 20 to the DC motor 10.

While the drive voltage is applied to the motor 10, the rotation angle detecting unit 133B calculates the rotation angle of the motor 10 based on the number of ripples detected by the ripple detector 122, and corrects the number of ripples detected by the ripple detector 122 based on the value of the current measured by the current measuring unit 133A and the voltage value output from the LPF 111 and output from the A/D converter 131. In a time period during which the drive voltage is applied to the DC motor 10, the DC motor 10 does not rotate by inertia but is driven by the drive voltage. Because the electric power supplied to the DC motor 10 is found based on the current value and the voltage value, the rotation angle of the DC motor 10 can be calculated by using both the number of ripples and the electric power. The rotation angle detecting unit 133B monitors whether the number of ripples corresponding to the electric power is obtained based on the electric power supplied to the DC motor 10. When the ripple is not detected or the ripple is erroneously detected due to noise or the like, the rotation angle of the DC motor 10 calculated by the rotation angle detecting unit 133B based on the electric power does not match the rotation angle of the DC motor 10 calculated based on the number of ripples. When the rotation angle of the DC motor 10 calculated based on the electric power does not match the rotation angle of the DC motor 10 calculated based on the number of ripples, the rotation angle detecting unit 133B corrects the number of ripples and then calculates the rotation angle of the DC motor 10.

The rotation angle detecting unit 133B obtains the rotation angle of the rotor of the DC motor 10 during the inertial rotation of the DC motor 10. In the present specification, the rotation angle of the rotor of the DC motor 10 is referred to as the rotation angle of the DC motor 10. A specific method of obtaining the rotation angle will be described later with reference to FIGS. 2 to 6.

The memory 133C stores programs and data used when the current measuring unit 133A and the rotation angle detecting unit 133B perform the processing, the output (the voltage value) of the A/D converter 131, the output (the current value) of the current measuring unit 133A, data of the pulse input from the ripple detector 122, and the like.

Figure 2A:
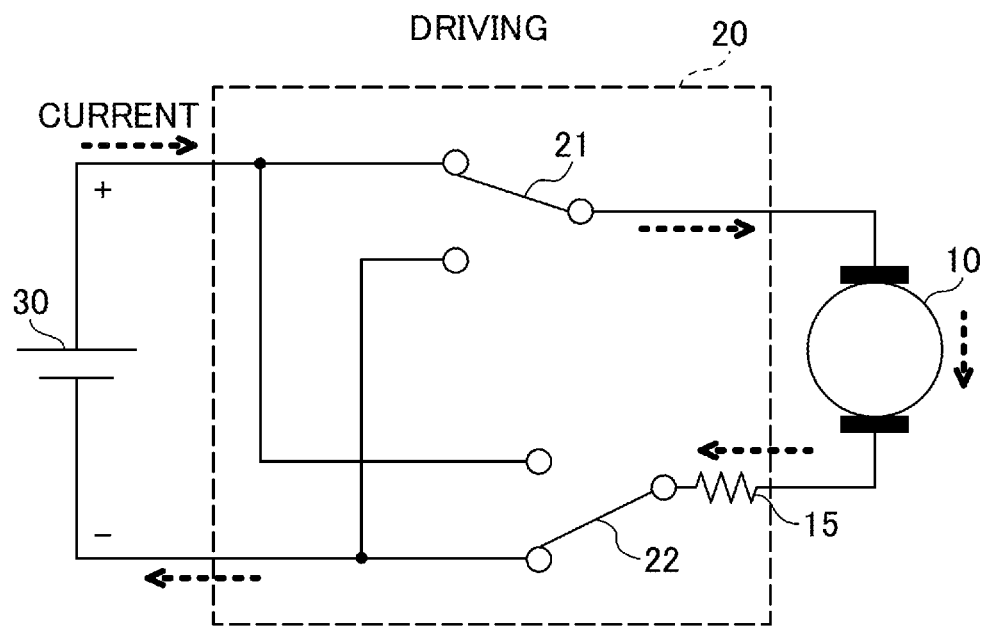
FIG. 2A is a diagram illustrating a connection state between a DC motor 10 and a drive circuit 20.
Figure 2B:
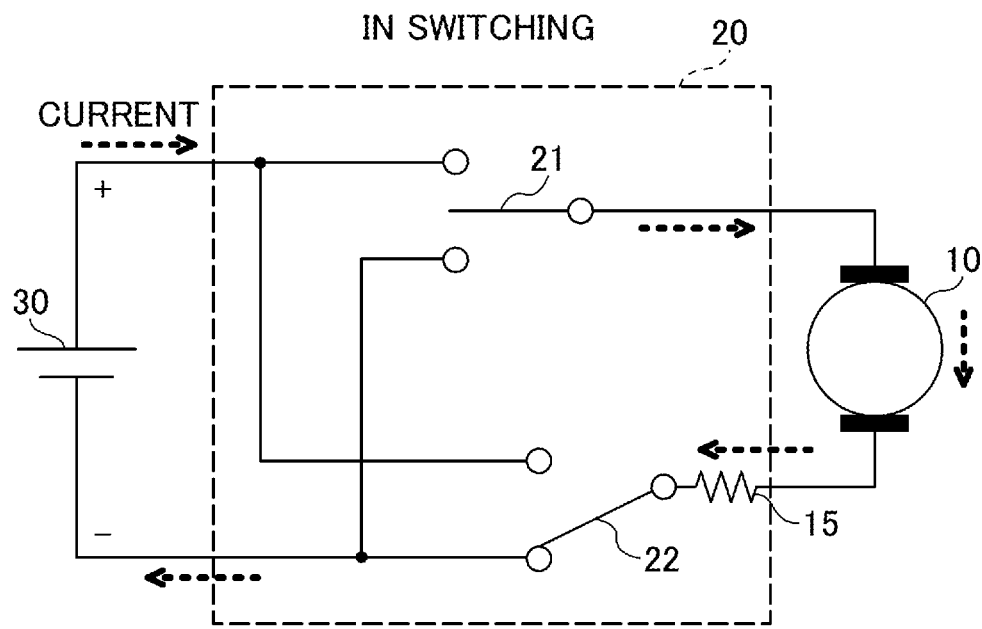
FIG. 2B is a diagram illustrating a connection state between the DC motor 10 and the drive circuit 20.
Figure 2C:
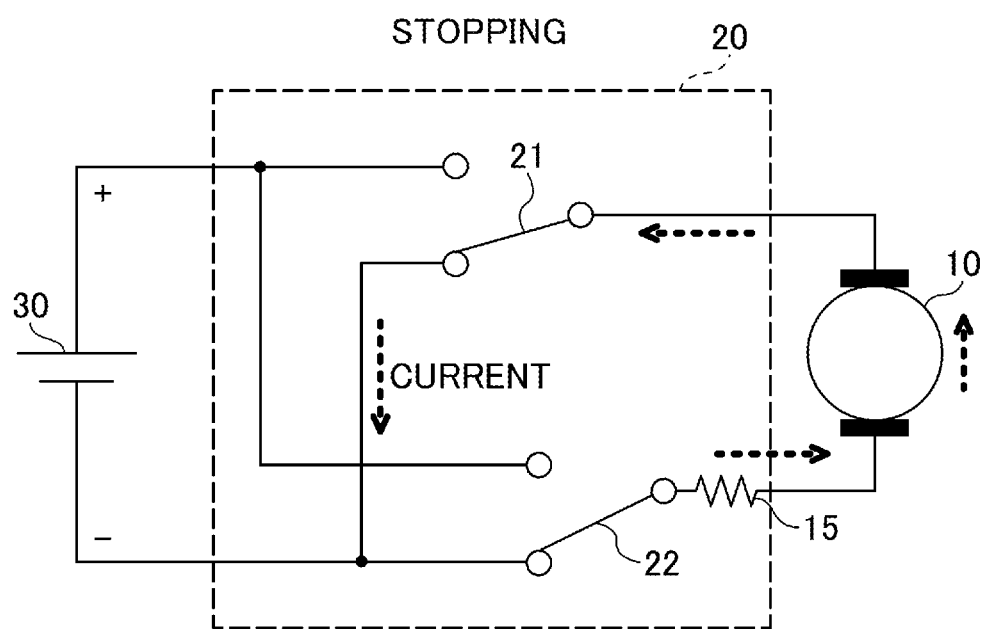
FIG. 2C is a diagram illustrating a connection state between the DC motor 10 and the drive circuit 20.

Next, connection states between the DC motor 10 and the drive circuit 20 will be described with reference to FIGS. 2A, 2B, and 2C. FIGS. 2A, 2B, and 2C are diagrams each illustrating the connection state between the DC motor 10 and the drive circuit 20. The drive circuit 20 includes two switches 21 and 22. FIG. 2A illustrates a connection state when the drive circuit 20 drives the DC motor 10.

In order to drive the DC motor 10, the switches 21 and 22 are switched to connect the DC motor 10 to the DC power supply 30. Additionally, FIG. 2B illustrates a state in which one terminal of the DC motor 10 is opened. When the driving of the DC motor 10 is stopped, the state illustrated in FIG. 2B is maintained for a short time and then the state transitions to the state illustrated in FIG. 2C. FIG. 2C illustrates a connection state when the drive circuit 20 stops the DC motor 10. In order to stop the driving of the DC motor 10, the switch 21 is switched so that the DC power supply 30 is not applied to both ends of the DC motor 10. As an example, in a state where the driving of the DC motor 10 is stopped, both terminals of the DC motor 10 are connected to the negative terminal of the DC power supply 30. This is a state in which both ends of the DC motor 10 are short-circuited. When both ends of the DC motor 10 are short-circuited, a back electromotive force generated by the rotation of the DC motor 10 is consumed by the resistor 15 connected to the DC motor 10, and the DC motor is stopped.

Here, a time period from the state, in which the voltage is applied from the drive circuit 20 to the DC motor 10 and the DC motor 10 is driven, to the state, in which the driving of the DC motor 10 is stopped and the rotation of the rotor is stopped, changes depending on the situation.

For example, in a state where the temperature of the DC motor 10 is low (for example, −30° C.), the voltage of the DC power supply 30 decreases and the rotation speed of the DC motor 10 decreases. When the rotation speed of the DC motor 10 is low, the time period from when both ends of the DC motor 10 are short-circuited to when the DC motor 10 stops becomes short.

Inversely, in a state where the temperature of the DC motor 10 is high and the voltage applied from the drive circuit 20 to the DC motor 10 is sufficiently large, the rotation speed of the DC motor 10 increases. When the rotation speed of the DC motor 10 is high, the time period from the stopping of the driving of the DC motor 10 to the stopping of the rotor becomes long.

If the time period from when the driving of the DC motor 10 is stopped to when the rotor is stopped is short, the accuracy of calculating the time constant indicating the deceleration state of the rotor decreases. Therefore, the rotation angle detecting device 100 uses a different method of calculating the rotation angle in the time period of the inertial rotation of the DC motor 10 depending on whether the time period during which the rotor of the DC motor 10 rotates by inertia is long or short. Whether the time period during which the rotor of the DC motor 10 rotates by inertia is long or short is determined based on whether a time period Tatt from a time point, at which the current flowing through the DC motor 10 is reversed, to a time point, at which the current flowing through the DC motor 10 becomes zero, is shorter than a predetermined time threshold. This processing will be described later.

<Method of Calculating the Rotation Angle in the Case where the Time Period During which the Rotor of the DC Motor 10 Rotates by Inertia is Long>

A circuit equation established for the DC motor 10 according to the theory of the DC motor will be described. Equations (1) and (2) below are established for the DC motor 10 according to the theory of the DC motor. L is the inductance of the motor 10, R is the resistance of the motor 10, J is the inertia of the rotor of the motor 10, Ke is a back electromotive force constant of the motor 10, Kt is a torque constant of the motor 10, Kv is a viscous friction coefficient of the motor 10, F is a load of the motor 10, u is the drive voltage applied from the drive circuit 20 to the DC motor 10, and i is the current flowing through the DC motor 10 that is measured by the current measuring unit 133A in FIG. 1. The current i is a current value obtained by the current measuring unit 133A measuring the output of the A/D converter 132, and represents a current waveform when arranged in time series.

[Equation 1]
$$L\frac{di}{dt} + Ri = u - Ke\omega \qquad (1)$$

[Equation 2]
$$J\frac{d\omega}{dt} + Kv\omega = Kti - F \qquad (2)$$

To stop the DC motor 10, first, as illustrated in FIG. 2B, the switch 21 of the drive circuit 20 is opened. Next, as illustrated in FIG. 2C, the switch 21 of the drive circuit 20 is switched to the ground side. Therefore, when a command to stop the DC motor 10 is issued, the DC motor 10 rotates at substantially the same speed for a while and then decelerates. Additionally, if the change amount (di/dt) of the current i is zero when the energy discharge of the inductance L is completed, a proportional relationship represented by Equation (3) is established between the current i and an angular velocity (rotational angular velocity) w of the DC motor 10 based on Equation (1). The angular velocity ω is the angular velocity of the rotor of the DC motor 10.

[Equation 3]
$$i = \frac{-Ke}{R}\omega \qquad (3)$$

When Equation (3) is substituted into Equation (2) and the differential equation is solved by assuming that the load F in a state where the terminals 11 and 12 of the DC motor 10 are short-circuited is zero, the angular velocity can be expressed by Equation (4) below. Here, ω0 is an angular velocity when the DC motor 10 starts inertial rotation, and τ is a time constant of the attenuation of the angular velocity ω of the DC motor 10.

[Equation 4]
$$\omega = \omega 0 e^{\frac{-t}{\tau}} \quad (4)$$

Additionally, the time constant τ of the attenuation of the angular velocity ω of the DC motor 10 can be expressed by Equation (5) below.

[Equation 5]
$$\tau = \frac{JR}{KvR - keKt} \quad (5)$$

As can be seen in Equation (5), the time constant τ is affected by variations in many parameters. As can be seen from equations (3) and (4), the angular velocity ω of the inertial rotation of the DC motor 10 attenuates along an exponential curve, and the current i also attenuates along the same exponential curve. That is, the time constant of the attenuation of the current i of the DC motor 10 is equal to the time constant τ of the attenuation of the angular velocity of the DC motor 10.

FIG. 3 illustrates graphs indicating temporal changes of the current i and the angular velocity ω before and after the DC motor 10 is stopped. The angular velocity in FIG. 3 was investigated using a sensor that measures the rotation angle of the rotor of the DC motor 10. In an actual product, a sensor that measures the rotation angle of the rotor is not provided. In an actual product, only the current i is measured to calculate the rotation angle of the rotor of the DC motor 10. A graph on the left side in FIG. 3 directly indicates temporal changes of the current i and the angular velocity ω before and after the DC motor 10 is stopped. When the DC motor 10 is stopped, the DC motor 10 rotates by inertia, the angular velocity ω attenuates along an exponential curve, and the current i also attenuates along the same exponential curve after a certain time period. Because the current i flows as a current due to the back electromotive force, a direction in which the current i flows is reversed, and after the current i reaches a peak, the current i and the angular velocity ω attenuate along substantially the same exponential curve. The current due to the back electromotive force is a reverse current that flows in a direction opposite to a direction in which the current flows when the DC motor 10 is driven.

Here, when the waveform of the current i on the left side in FIG. 3 is multiplied by −K and superimposed on the waveform of the angular velocity ω, the waveform of the current i overlaps the waveform of the angular velocity ω in the time period of the inertial rotation as indicated on the right side in FIG. 3. The time constant of the attenuation of the current i of the DC motor 10 is equal to the time constant τ of the attenuation of the angular velocity of the DC motor 10. Therefore, in the rotation angle detecting device 100, the angular velocity ω is obtained from the current i by using the time constant τ of the attenuation of the current i of the DC motor 10 instead of the time constant τ of the attenuation of the angular velocity of the DC motor 10, and the rotation angle in the time period of inertial rotation of the DC motor 10 is detected based on the obtained angular velocity ω. That is, the rotation angle detecting device 100 estimates and uses the time constant τ of the attenuation of the current i obtained based on the current i in the time period of the inertial rotation of the DC motor 10 as the time constant τ of the attenuation of the angular velocity in the time period of the inertial rotation of the DC motor 10, thereby detecting the rotation angle in the time period of the inertial rotation of the DC motor 10.

Figure 4:
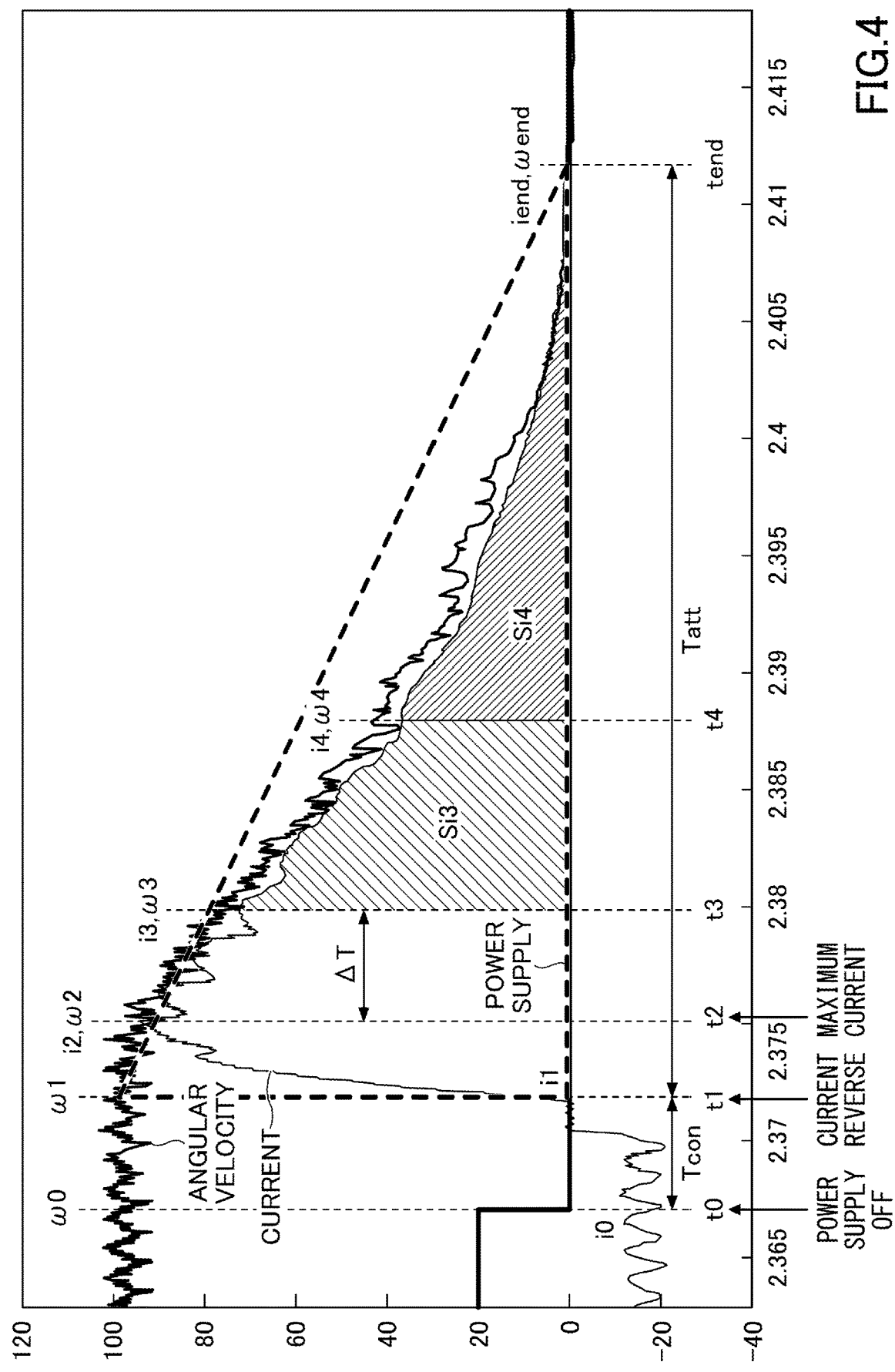
FIG. 4 is a graph indicating the angular velocity $\omega$ and the current i of the DC motor 10 in a case where a time period during which the DC motor 10 rotates by inertia is long.

Next, a method of detecting the angular velocity ω based on the current i of the DC motor 10 will be described with reference to FIG. 4. FIG. 4 is a graph indicating the angular velocity ω and the current i of the DC motor 10 in the case where the time period during which the DC motor 10 rotates by inertia is long. FIG. 4 illustrates an enlarged view in the time period of the inertial rotation illustrated on the right side in FIG. 3. That is, the current i indicated in FIG. 4 is represented by the waveform obtained by multiplying the waveform of the current i on the left side in FIG. 3 by −K. Here, the case where the time period during which the DC motor 10 rotates by inertia is long is a case where the time period Tatt from the time point, at which the current flowing through the DC motor 10 is reversed, to the time point, at which the current flowing through the DC motor 10 becomes zero, is longer than or equal to a predetermined time threshold.

In the following, a method of calculating a current integral value and the like using the waveform of the current i obtained by multiplication of −K to overlap the waveform of the angular velocity ω as illustrated in FIG. 4 will be described, but the current i does not need to be multiplied by −K in actual calculation. Thus, the calculation method will be described using the current i without change.

In FIG. 4, a time point t0 is a time point at which a command to stop the motor 10 is issued. The motor 10 starts to rotate by inertia from the time point t0. The angular velocity ω0 at the time point t0 is an angular velocity of the DC motor 10 during driving. The angular velocity ω0 can be calculated based on the pulse input from the ripple detector 122. When the command to stop the DC motor 10 is issued, the drive circuit 20 is first in the connection state illustrated in FIG. 2B.

Here, the method will be described using a time period from the time point t0, at which the DC motor 10 starts to rotate by inertia, to a time point tend, at which the current i of the DC motor 10 becomes zero. Because it is conceivable that the rotation of the DC motor 10 is stopped when the current i becomes zero, it is conceivable that an angular velocity wend of the DC motor 10 at the time point tend is zero.

A time point t1 is a time point at which the polarity of the current i is inverted. The time point t1 is a time point at which the value of a current −Ki obtained by multiplication of −K indicated in FIG. 4 is inverted from negative to positive (the polarity is inverted), and is a time point at which the value of the actual current i is inverted from positive to negative (the polarity is inverted). Therefore, the current value i1 at the time point t1 is zero.

Shortly after the command to stop the DC motor 10 is issued, the drive circuit 20 is switched to the connection state illustrated in FIG. 2C. When the drive circuit 20 is in the connection state illustrated in FIG. 2C, the current flows, by the back electromotive force, in a direction opposite to the direction in which the current flows when the DC motor 10 is driven. The time point t1 is a time point at which the polarity of the current i is inverted by the current flowing in the reverse direction due to the back electromotive force. The angular velocity ω1 at the time point t1 is treated as being equal to the angular velocity ω0. From the time point t0 at which the command to stop the DC motor 10 is issued to the time point t1 at which the back electromotive force is generated, a brake, caused by the back electromotive force being consumed by the resistance, is hardly applied.

A time point t2 is a time point at which the current −Ki takes a maximum value (the current i takes a peak value). That is, the time point t2 is a time point at which the absolute value of the actual current i takes a peak value. In other words, the time point t2 is a time point at which the actual current i takes a minimum value. In FIG. 4, the current i takes the maximum value at the time point t2, but because FIG. 4 is a graph in which the sign of the current is inverted, the current i takes the minimum value at the time t2. A current value i2 at the time point t2 is the minimum of the actual current i and is the peak value of the absolute value. Because the current i fluctuates, when the current i measured by the current measuring unit 133A falls within a predetermined range, the rotation angle detecting unit 133B may determine that the absolute value of the current i reaches the peak value. An angular velocity ω2 at the time point t2 is attenuated less than the angular velocity ω1 at the time point t1. This is because the brake, caused by the current i flowing in the reverse direction, is applied.

A time point t3 is a time point after a predetermined time ΔT has elapsed from the time point t2 (after a predetermined time has elapsed). The predetermined time ΔT is a time period, from a time point at which the current −Ki takes the maximum value, considered to be required until the fluctuation width of the value of the current −Ki falls within a certain range. With respect to the actual current i, the predetermined time ΔT is a time period, from a time point at which the absolute value of the current i reaches the peak value, considered to be required until the fluctuation width of the value of the current i is within a certain range. As an example, the predetermined time ΔT is about 1/10 of the time period required from the time point t2 to the time point tend at which the current i becomes zero. Data representing the predetermined time ΔT may be stored in the memory 133C in advance.

As described above, because the current i attenuates along the exponential curve the same as that of the angular velocity ω while a certain period elapses from the start of the inertial rotation, the current i after the time point t3 can be expressed by Equation (6) below using a current value i3 at the time point t3 from Equation (4).

[Equation 6]

$$i(t) = i3 \cdot e^{\frac{-(t-t3)}{\tau}} \quad (6)$$

Additionally, a time point between the time point t3 and the time point tend at which the current i becomes zero in FIG. 4 is referred to as a time point t4. Further, the current integral value of the current i from the time point t3 to the time point t4 is Si3, and the current integral value of the current i from the time point t4 to the time point tend is Si4.

The rotation angle detecting unit 133B obtains the current integral value Si3+Si4 of the current i from the time point t3 to the time point tend through the time point t4, and the current integral value Si4 of the current i from the time point t4 to the time point tend. The current integral value Si3+Si4 is an example of a first current integral value, and the current integral value Si4 is an example of a second current integral value.

The current integral value Si3+Si4 and the current integral value Si4 can be obtained by Equations (7) and (8) below, respectively.

[Equation 7]

$$Si3 + Si4 = \int_{t3}^{\infty} i(t)\,dt = \tau \cdot i3 \quad (7)$$

[Equation 8]

$$Si4 = \int_{t4}^{\infty} i(t)\,dt = \tau \cdot i3 \cdot e^{\frac{-(t4-t3)}{\tau}} \quad (8)$$

The integration processing of the current i achieved by Equations (7) and (8) provides a filter effect corresponding to filter processing, and thus has an effect of removing a ripple component included in the current i.

The time point t4 can be expressed by Equation (9) below. Kr in Equation (9) is an adjustment coefficient less than 1 (Kr<1).

[Equation 9]

$$t4 = t3 + Kr^*(\text{tend} - t3) \quad (9)$$

The time point t4 may be any time point as long as the time point is between the time point t3 and the time point tend. However, for convenience of calculation using the current integral values Si3 and Si4 described later, it is preferable that the time point t4 is set such that there is a certain time period before the time point tend in order to prevent the current integral value Si4 from becoming excessively small, and such that the current integral value Si3 and the current integral value Si4 are not equal to each other.

The time constant τ of the attenuation of the current i of the DC motor 10 can be obtained as in Equation (10) below from Equations (7) and (8). Because the time constant τ of the attenuation of the current i of the DC motor 10 is equal to the time constant of the attenuation of the angular velocity of the DC motor 10, the time constant τ is obtained instead of the time constant of the attenuation of the angular velocity of the DC motor 10.

[Equation 10]

$$\tau = (t4 - t3) \div \ln\left(\frac{Si3 + Si4}{Si4}\right) \quad (10)$$

The natural logarithm in Equation (10) includes division processing: (Si3+Si4)/Si4, and thus error included in circuits such as the LPF 112 and the A/D converter 132 are canceled out. Therefore, by using Equation (10), an effect of reducing the measurement error of the current can be obtained.

Additionally, the time constant τ of the attenuation of the current i of the DC motor 10 may be directly obtained from Equation (7) as in Equation (11) below, instead of Equation (10).

[Equation 11]

$$\tau = \frac{Si3 + Si4}{i3} \quad (11)$$

When the time constant τ is calculated using Equation (11), the number of calculations is less and the calculation is simpler in comparison with the calculation when the time constant τ is calculated using Equation (10). However, because the current value i3 is used in Equation (11), the time constant τ is more easily affected by the ripple component and the measurement error than the time constant τ calculated using Equation (10). Therefore, which of Equation (10) and Equation (11) is used may be determined depending on the use application of the rotation angle detecting device 100 or the like.

The drive circuit 20 is in the connection state illustrated in FIG. 2B from the time point t0 at which the command to stop the motor 10 is issued to the time point t1. In the state of FIG. 2B, one end of the switch 21 is not electrically connected to anywhere, and both ends of the DC motor 10 are opened. While both ends of the DC motor 10 are opened, the DC motor 10 rotates at the speed substantially the same as the speed when the DC motor 10 is driven. The rotation angle of the DC motor 10 can be obtained as follows.

Here, the time period from the time point t0 at which the power supply is turned off (the driving of the DC motor 10 is stopped) to the time point tend is divided into time periods Tcon and Tatt for calculation. The time period Tcon is a time period from the time point t0 to the time point t1. That is, Tcon=t1−t0. The time period Tatt is a time period from the time point t1 to the time point tend. That is, Tatt=tend−t1.

In the time period Tcon, the brake caused by the current i generated by the back electromotive force is hardly applied to the rotor of the DC motor 10. Thus, the average of the angular velocity ω of the DC motor 10 in the time period Tcon is equivalent to the angular velocity ω0 in the time period during which the DC motor 10 is being driven, and it can be considered that the DC motor 10 rotates at a constant speed. The angular velocity ω0 can be calculated based on the pulse input from the ripple detector 122 while the DC motor 10 is being driven. A rotation angle θ1 by which the DC motor 10 rotates in the time period Tcon can be obtained by Equation (12) below.

[Equation 12]

$$\theta1 = \omega0 \cdot Tcon \quad (12)$$

Additionally, in the time period Tatt, the drive circuit 20 is in the connection state illustrated in FIG. 2C, and the angular velocity of the DC motor 10 attenuates. The angular velocity ω1 at the time point t1, which is the start point of the time period Tatt, is substantially equal to the angular velocity ω0 immediately before the time point t1. Therefore, a rotation angle θ2 by which the DC motor 10 rotates in the time period Tatt can be obtained by Equation (13) below from Equation (4).

[Equation 13]

$$\theta2 = \int_{t_1}^{\infty} \omega1 e^{\frac{-(t-t1)}{\tau}} dt = \omega1 \cdot \tau = \omega0 \cdot \tau \quad (13)$$

As described above, the rotation angle θ of the DC motor 10 in the time period from the time point t0, at which the drive circuit 20 issues the command to stop the DC motor 10, to the time point tend, at which the current i becomes zero, can be obtained by Equation (14) below as the total angle of the rotation angle θ1 in the time period Tcon and the rotation angle θ2 in the time period Tatt.

[Equation 14]

$$\theta = \omega0 \cdot Tcon + \omega0 \cdot \tau \quad (14)$$

As described above, when the rotor of the DC motor 10 rotates by inertia for a long time, the rotation angle detecting device 100 can obtain the rotation angle θ in the time period in which the DC motor 10 rotates by inertia. Next, a method of calculating a rotation angle in a case where the time period during which the rotor of the DC motor 10 rotates by inertia is short will be described.

<Method of Calculating the Rotation Angle in the Case where the Time Period During which the Rotor of the DC Motor 10 Rotates by Inertia is Short>

In the case where the time period during which the rotor of the DC motor 10 rotates by inertia is short, the temperature of the DC motor 10 is low (for example, −30° C.) and the voltage applied to the DC motor 10 is low, for example. In such a state, the time period Tatt from the time point, at which the current flowing through the DC motor 10 is reversed, to the time point, at which the current flowing through the DC motor 10 becomes zero, becomes shorter than a predetermined time threshold Tth. When the time period Tatt is shorter than the predetermined time threshold Tth, the rotation angle detecting unit 133B obtains the rotation angle θ of the DC motor 10 as follows.

Figure 5:
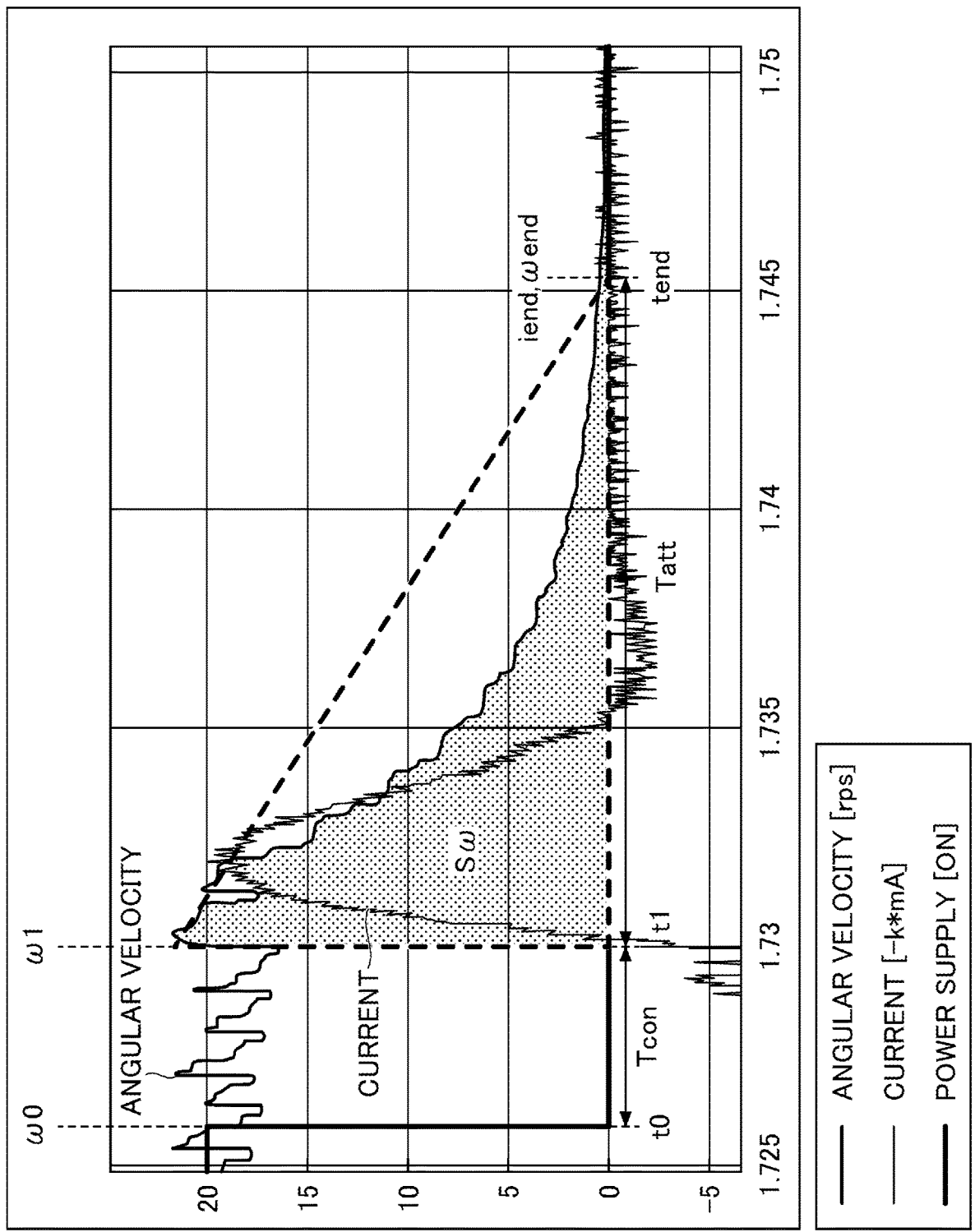
FIG. 5 is a graph indicating the angular velocity $\omega$ and the current i of the DC motor 10 in a case where the time period during which the DC motor 10 rotates by inertia is short.

FIG. 5 is a graph indicating the angular velocity ω and the current i of the DC motor 10 in the case where the time period during which the DC motor 10 rotates by inertia is short. In the state where the time period during which the rotor of the DC motor 10 rotates by inertia is short as illustrated in FIG. 5, the time period Tatt from the time point t1, at which the polarity of the current i is inverted, to the time point tend, at which the current i of the DC motor 10 becomes zero, becomes short. Thus, the rotation angle θ of the DC motor 10 cannot be accurately obtained by the above-described Equation (14). In the case where the time period Tatt is short, when the time constant τ of the attenuation of the current i of the DC motor 10 is obtained according to the above-described Equation (10), the error with respect to the measured value becomes large, and the time constant τ cannot be accurately obtained. Therefore, the rotation angle θ cannot be accurately obtained.

Here, because the rotation angle θ of the DC motor 10 is a value obtained by integration of the angular velocity ω indicated in FIG. 5, even when the time period Tatt is shorter than the predetermined time threshold Tth, the rotation angle θ of the DC motor 10 becomes an area S w of a portion surrounded by the angular velocity ω and the horizontal axis in the time period Tatt indicated in FIG. 5.

Here, the area Sω can be regarded as a portion of the area of a triangle indicated by the broken lines having the length of the time period Tatt in the time direction and the height of the angular velocity ω1 at the time point t1, and it is conceivable that the area Sω can be approximately obtained by multiplying the area Sω by a predetermined coefficient.

When the predetermined coefficient is C, a rotation angle θatt of the DC motor 10 in the time period Tatt in the case where the time period Tatt is shorter than the predetermined time threshold Tth can be expressed by Equation (15) below.

[Equation 15]

$$\theta att = \omega0 \cdot Tatt \cdot 0.5 \cdot C \quad (15)$$

Here, if 0.5×C is redefined as a predetermined coefficient, the predetermined coefficient C becomes a coefficient less than or equal to 0.5, and Equation (15) becomes Equation (16) below.

[Equation 16]

$$\theta att = \omega0 \cdot Tatt \cdot C \quad (16)$$

Additionally, the rotation angle θ of the DC motor 10 in the time period (Tcon+Tatt) from the time point t0, at which the command to stop the DC motor 10 is issued, to the time point tend, at which the current i becomes zero, can be obtained by Equation (17) below as the total angle of the rotation angle θcon in the time period Tcon and the rotation angle θatt in the time period Tatt.

[Equation 17]

$$\theta = \theta con + \theta att = \omega 0 \cdot Tcon + \omega 0 \cdot Tatt \cdot C \quad (17)$$

Here, when the predetermined coefficient C is obtained based on the rotation angle θatt of the DC motor 10 in the time period Tatt, the predetermined coefficient C can be expressed as Equation (18) below.

[Equation 18]

$$C = \frac{\theta att}{\omega 0 \cdot Tatt} \quad (18)$$

As an example, when the value of the predetermined coefficient C was obtained by an experiment in which the temperature of the DC motor 10 was set to multiple temperatures within a range of −30° C. to 0° C. (−30° C. or greater and 0° C. or less) and the driving voltage of the DC motor 10 was set to multiple voltage values, it was confirmed that Equation (16) was established.

The value of the predetermined coefficient C is, for example, 0.36, and can be a value of $0.1 \leq C \leq 0.5$ depending on the type of the DC motor 10, the type of the weather strip of the power window 50, the type of the drive mechanism 51, and the like.

As described above, in the case where the time period in which the rotor of the DC motor 10 rotates by inertia is short and the time period Tatt is shorter than the predetermined time threshold Tth, it is found that the rotation angle θ of the DC motor 10 may be obtained according to Equation (17).

<Flowchart>

Figure 6:
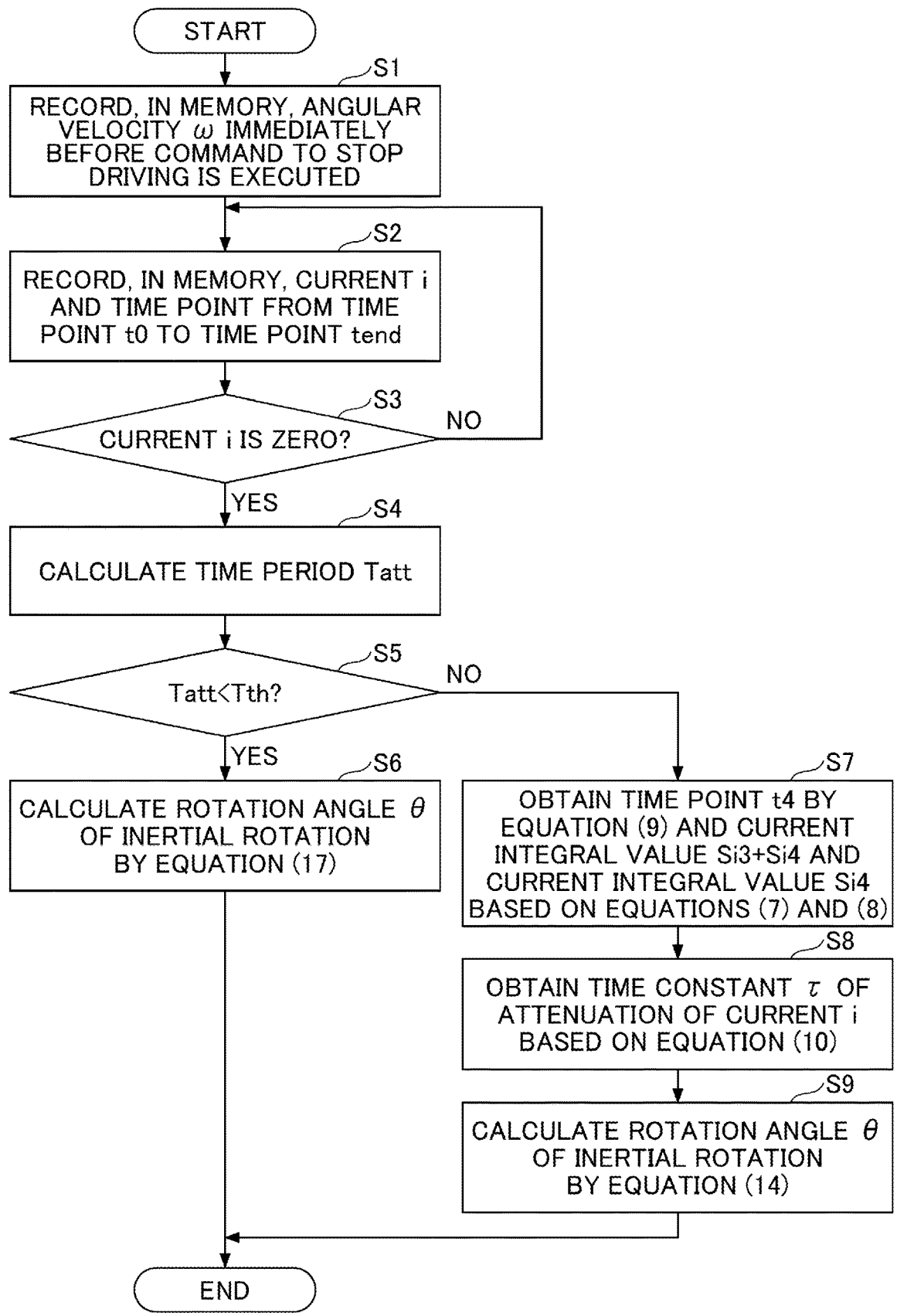
FIG. 6 is a diagram illustrating a flowchart representing a process of detecting a rotation angle by a rotation angle detecting unit 133B.

Here, a process in which the rotation angle detecting unit 133B detects the rotation angle will be described with reference to FIG. 6. FIG. 6 is a diagram illustrating a flowchart illustrating the process in which the rotation angle detecting unit 133B detects the rotation angle. The process illustrated in FIG. 6 is a process achieved by the processing unit 133 executing a rotation angle detecting program according to the embodiment, and is a process achieved by the rotation angle detecting method according to the embodiment. To be more specific, as a premise, the current measuring unit 133A performs the current measurement process of measuring the current i of the DC motor 10, and the rotation angle detecting unit 133B performs a rotation angle detection process described below.

When the command to stop the motor 10 is executed, the rotation angle detecting unit 133B starts the process illustrated in FIG. 6. The rotation angle detecting unit 133B may set a time point, at which the drive controller (not illustrated) outputs, to the drive circuit 20, a control command to stop the DC motor 10, as the time point t0. Here, as an example, the rotation angle detecting unit 133B may determine that the driving of the DC motor 10 is stopped when the voltage value of the DC motor 10 input from the A/D converter 131 becomes zero (or less than or equal to a predetermined value close to zero). Additionally, the rotation angle detecting unit 133B may set a time point, at which the polarity of the current i of the DC motor 10 measured by the current measuring unit 133A is inverted, as the time point t1. Whether the current i of the DC motor 10 has become zero may be determined based on whether the current i of the DC motor 10 measured by the current measuring unit 133A has become zero. The rotation angle detecting unit 133B may set a time point, at which the current i of the DC motor 10 measured by the current measuring unit 133A becomes zero, as the time point tend.

The rotation angle detecting unit 133B calculates the angular velocity ω0 immediately before the driving of the DC motor 10 is stopped, based on the pulse converted by the ripple detector 122 immediately before the driving of the DC motor 10 is stopped (step S1).

The rotation angle detecting unit 133B records, in the memory 133C, the current i measured by the current measuring unit 133A from the time point t0 until the current i becomes zero (to the time point tend) and the time (the time point) (step S2). As a specific example, the rotation angle detecting unit 133B sequentially records, in the memory 133C, a pair of the time elapsed from the time point t0 and the current value at that time point for each operation of a periodic task (a task that is activated at regular intervals using a timer of the microcomputer 130 or the like). In step S2, the time point t1, at which the polarity of the current i is inverted, and the time point t2, at which the current i reaches its peak, are also recorded. As a specific example, the rotation angle detecting unit 133B sequentially checks the pair of the elapsed time and the current value recorded in the memory 133C from the time point t0, and records the elapsed time at the time point, at which the current value is zero or the polarity of the current value is inverted, in the memory 133C as the time point t1. Additionally, the rotation angle detecting unit 133B records the elapsed time corresponding to the minimum current value among all current values in the memory 133C as the time point t2.

The rotation angle detecting unit 133B determines whether the current i of the DC motor 10 becomes zero (step S3). If the current i is not zero, the recording is continued in step S2.

When the current i of the DC motor 10 becomes zero (YES in step S3), the rotation angle detecting unit 133B calculates the time period Tatt (step S4). The rotation angle detecting unit 133B may calculate the time period from the time point t1 to the time point tend as the time period Tatt.

The rotation angle detecting unit 133B determines whether the time period Tatt is less than the predetermined time threshold Tth (step S5). This is because it is appropriate to calculate the rotation angle θ based on Equation (14) if the time period Tatt is greater than or equal to the predetermined time threshold Tth, and to calculate the rotation angle θ based on Equation (17) if the time period Tatt is less than the predetermined time threshold Tth.

If the rotation angle detecting unit 133B determines that the time period Tatt is less than the predetermined time threshold Tth (S5: YES), the rotation angle detecting unit 133B calculates the rotation angle θ based on Equation (17) (step S6).

<Process of Calculating the Rotation Angle θ Based on Equation (17)>

In the processing of step S6, the rotation angle detecting unit 133B calculates the time period from the time point t0 to the time point t1 as the time period Tcon, and calculates the time period from the time point t1 to 5 the time point tend as the time period Tatt. Additionally, the rotation angle detecting unit 133B calculates the angular velocity ω0 in the processing of step S1 described later. Then, the rotation angle detecting unit 133B may calculate the rotation angle θ by substituting the angular velocity ω0, the time period Tcon, and the time period Tatt into Equation (17).

With respect to the above, if the rotation angle detecting unit 133B determines in step S5 that the time period Tatt is not less than the predetermined time threshold Tth (S5: NO), the process proceeds to step S7.

The rotation angle detecting unit 133B calculates the time point t4 by Equation (9), and respectively obtains the current integral value Si3+Si4 and the current integral value Si4 based on Equations (7) and (8) below (step S7). Here, the time point t3 is obtained by adding a predetermined time ΔT to the time point t2. The rotation angle detecting unit 133B stores the time point t3, the time point t4, the current integral value Si3+Si4, and the current integral value Si4 in the memory 133C.

The rotation angle detecting unit 133B obtains the time constant τ of the attenuation of the current i of the DC motor 10 based on Equation (10) (step S8). Additionally, the rotation angle detecting unit 133B may obtain the time constant τ by using Equation (11). Additionally, with respect to the current value i3 used in Equation (11), the rotation angle detecting unit 133B may extract the current value at the time point t3 from the memory 133C as the current value i3.

The rotation angle detecting unit 133B obtains the rotation angle θ of the DC motor 10 in the time period from the time point t0, at which the power supply of the DC motor 10 is turned off, to the time point tend, at which the current i becomes zero, based on Equation (14) (step S9). When the rotation angle detecting unit 133B determines in step S5 illustrated in FIG. 6 that the time period Tatt is not less than the predetermined time threshold Tth (S5: NO), the rotation angle detecting unit 133B outputs the rotation angle θ calculated based on Equation (14) in step S9. Then, a series of processing is completed (END).

<Effects>

As described above, the rotation angle detecting method according to the embodiment is a rotation angle detection method including the current measurement process of measuring the current flowing through the DC motor 10 and the rotation angle detection process of obtaining the rotation angle θ of the DC motor 10 based on the value of the current measured by the current measurement process. In the rotation angle detection process, the rotation angle θ in the inertial rotation is obtained based on the angular velocity ω0 of the DC motor 10 immediately before the time point t0, at which the driving of the DC motor 10 is stopped, the time period Tcon from the time point t0, at which the driving of the DC motor 10 is stopped, to the time point t1, at which the polarity of the value of the current measured by the current measurement process is inversed, and the time period Tatt from the time point t1, at which the polarity of the value of the current measured by the current measurement process is inverted, to the time point tend, at which the value of the current measured by the current measurement process becomes zero. Therefore, even when the temperature of the DC motor 10 is low (for example, −30° C.), the voltage applied from the drive circuit 20 to the DC motor 10 is low, and then the time period during which the DC motor 10 rotates by inertia is short, the rotation angle of the DC motor 10 can be accurately detected.

Therefore, the rotation angle detecting method, the rotation angle detecting program, and the rotation angle detecting device 100 that can accurately detect the rotation angle of the DC motor 10 even when the rotation angle of the DC motor 10 due to the inertial rotation changes, which is caused by the change in the ease of rotation of the DC motor 10 due to the change in the temperature, can be provided. Additionally, the rotation angle θ due to the inertial rotation can be accurately obtained, even when the driving force of the DC motor 10 is low as in the case where the driving is stopped before the angular velocity reaches the maximum velocity.

In the rotation angle detection process, the rotation angle θ in the inertial rotation is obtained using a value obtained by multiplying the angular velocity ω0 of the DC motor 10 immediately before the time point t0, at which the driving of the DC motor 10 is stopped, by the time period Tcon from the time point t0, at which the driving of the DC motor 10 is stopped, to the time point t1, at which the polarity of the value of the current measured by the current measurement process is inverted. Therefore, the rotation angle during the inertial rotation period can be accurately obtained using the fact that the DC motor 10 rotates at substantially the same angular velocity ω0 in the time period Tcon in which the brake caused by the current i flowing in the reverse direction is hardly applied after the driving of the DC motor 10 is stopped.

In the rotation angle detection process, the rotation angle θ in the inertial rotation is obtained using a value obtained by multiplying the angular velocity ω0 of the DC motor 10 immediately before the time point t0, at which the driving of the DC motor 10 is stopped; the time period Tatt from the time point t1, at which the polarity of the value of the current measured in the current measurement process is inverted, to the time point tend, at which the value of the current measured in the current measurement process becomes zero; and the predetermined constant C (C≤0.5). Therefore, even if the ease of rotation of the DC motor 10 changes due to a change in the temperature, the rotation angle of the DC motor 10 can be accurately detected in accordance with the changed ease of rotation of the DC motor 10.

In the rotation angle detection process, the rotation angle θ in the inertial rotation is obtained according to Equation (19) below using the angular velocity ω0 of the DC motor 10 immediately before the time point t0, at which the driving of the DC motor 10 is stopped; the time period Tcon from the time point t0, at which the driving of the DC motor 10 is stopped, to the time point t1, at which the polarity of the value of the current measured by the current measurement process is inverted; the time period Tatt from the time point t1, at which the polarity of the value of the current measured by the current measurement process is inverted, to the time point tend, at which the value of the current measured by the current measurement process becomes zero; and the predetermined constant C (C≤0.5).

[Equation 19]

$$\theta = \omega 0 \cdot T\text{con} + \omega 0 \cdot T\text{att} \cdot C \tag{19}$$

Thus, the rotation angle during the inertial rotation period can be accurately obtained using the fact that the DC motor 10 rotates at substantially the same angular velocity ω0 in the time period Tcon in which the brake caused by the current i flowing in the reverse direction is hardly applied after the driving of the DC motor 10 is stopped. Additionally, even if the ease of the rotation of the DC motor 10 changes due to a change in the temperature, the rotation angle of the DC motor 10 can be accurately detected in accordance with the changed ease of the rotation of the DC motor 10.

In the rotation angle detection process, in the case where the time period Tatt from the time point t1, at which the polarity of the value of the current measured by the current measurement process is inverted, to the time point tend, at which the value of the current measured by the current measurement process becomes zero, is shorter than the predetermined time threshold Tth, the rotation angle θ in the inertial rotation is obtained according to Equation (19). Thus, the state, in which the temperature of the DC motor 10 is low (for example, −30° C.) and the voltage applied from the drive circuit 20 to the DC motor 10 is low so that the DC motor 10 does not easily rotate by inertia, can be easily determined based on the time period Tatt and the predetermined time threshold Tth. Therefore, even in the state in which the DC motor 10 does not easily rotate by inertia, the rotation angle of the DC motor 10 can be accurately detected.

In the rotation angle detection process, in the case where the time period Tatt from the time point t1, at which the polarity of the value of the current measured by the current measurement process is inverted, to the time point tend, at which the value of the current measured by the current measurement process becomes zero, is greater than or equal to the predetermined time threshold Tth, the rotation angle θ in the inertial rotation of the DC motor 10 is obtained according to Equation (20) below based on the angular velocity ω0 immediately before the time point t0, at which the driving of the DC motor 10 is stopped; the time period Tcon from the time point t0, at which the driving of the DC motor 10 is stopped, to the time point t1, at which the polarity of the value of the current measured by the current measurement process is inverted; and the time constant τ of the attenuation of the current.

[Equation 20]

$$\theta = \omega 0 \cdot Tcon + \omega 0 \cdot \tau \quad (20)$$

Thus, in the case where the time period during which the DC motor 10 rotates by inertia is long, the rotation angle in the inertial rotation of the DC motor 10 can be obtained using the time constant τ of the attenuation of the current i, which can be used instead of the time constant τ of the attenuation of the angular velocity ω.

Additionally, the rotation angle detection process includes a current measurement process of measuring the voltage applied to the DC motor 10 and a ripple detection process of detecting a ripple of the current flowing through the DC motor 10. In the rotation angle detection process, while the drive voltage is applied to the DC motor 10, the rotation angle θ of the DC motor 10 is calculated based on the number of ripples detected in the ripple detection process, and the number of ripples is corrected based on the value of the current measured by the current measurement process and the value of the voltage measured by the voltage measurement process. Therefore, while the drive voltage is applied to the DC motor 10, the number of ripples can be corrected and the rotation angle of the rotation of the DC motor 10 can be accurately obtained.

In the case where the rotor of the DC motor 10 rotates by inertia for a long time, the rotation angle θ in the time period during which the DC motor 10 rotates by inertia can be obtained very easily. Additionally, because the time constant τ can be obtained by Equation (10) in real time during the time period of the inertial rotation, the problem of the parameter error and the problem of the angle accumulation error in the conventional method can be solved, so that the rotation angle can be detected with extremely high accuracy. Further, for example, the accuracy of the rotation angle in the system including the power window 50 can be greatly improved, and a response capability to individual differences, environmental changes, and aging changes can be greatly improved. Therefore, the rotation angle detecting method, the rotation angle detecting program, and the rotation angle detecting device 100 that can obtain the rotation angle of the DC motor 10 with high accuracy while the DC motor 10 rotates by inertia can be provided.

The rotation angle detecting device 100 obtains the time constant τ of the attenuation of the current i based on the current in the time period of the inertial rotation of the DC motor 10, estimates the obtained time constant τ as the time constant τ of the attenuation of the angular velocity in the time period of the inertial rotation of the DC motor 10, and obtains the rotation angle of the DC motor 10. Thus, the rotation angle of the DC motor 10 can be easily detected based on the current i.

Additionally, the opening/closing amount of the power window 50 can be calculated based on the rotation angle θ detected by the rotation angle detecting device 100. For example, when the power window 50 is stopped at a position between the fully opened position and the fully closed position, the opening/closing amount of the power window 50 can be obtained with high accuracy. It is obligatory that the power window 50 is provided with a pinch prevention mechanism. Thus, when the power window 50 is stopped at a position between the fully opened position and the fully closed position and is then opened and closed, it is necessary to accurately detect the position at which the power window 50 is stopped.

Additionally, because the rotation angle detecting device 100 can detect the rotation angle of the DC motor 10 with high accuracy without detecting the opening/closing amount of the power window 50 by using an expensive device such as a Hall IC, the manufacturing cost can be significantly reduced.

Additionally, the time constant τ of the attenuation of the current i is obtained based on the time point t3, the time point t4, the time point tend, the current integral value Si3+Si4, and the current integral value Si4. Therefore, the time constant τ of the attenuation of the current i, which can be used instead of the time constant τ of the attenuation of the angular velocity ω, can be easily obtained based on the temporal change of the current i. Further, because the integration processing for obtaining the current integral value corresponds to the filtering processing, there is an effect that the ripple component included in the current i can be removed, and the rotation angle of the DC motor 10 can be detected with high accuracy.

Additionally, because the time constant τ of the attenuation of the current i can be obtained based on Equation (10), the time constant τ of the attenuation of the current i, which can be used instead of the time constant τ of the attenuation of the angular velocity ω, can be easily obtained by incorporating Equation (10) into the program executed by the processing unit 133. Additionally, the rotation angle of the DC motor 10 can be detected with high accuracy by removing the ripple component included in the current i according to the program executed by the processing unit 133, using the filter effect of the integration processing. Further, because the natural logarithm in Equation (10) includes the division processing of the current integral value, the errors included in the circuits such as the resistor 15, the LPF 112, and the A/D converter 132 are canceled out. Therefore, the rotation angle of the DC motor 10 can be detected with high accuracy.

Additionally, because the time constant τ of the attenuation of the current i is obtained based on the time point t3 and the current integral value Si3+Si4 of the current values measured by the current measuring unit 133A from the time point t3 to the time point tend, the time constant τ of the attenuation of the current i, which can be used instead of the time constant τ of the attenuation of the angular velocity ω, can be more easily obtained with a small number of calculations. Further, because the integration processing for obtaining the current integral value corresponds to the filter processing, there is an effect that the ripple component included in the current i can be removed, and the rotation angle of the DC motor 10 can be detected with high accuracy.

Additionally, because the time constant τ of the attenuation of the current i can be obtained based on Equation (11), the time constant τ of the attenuation of the current i, which can be used instead of the time constant τ of the attenuation of the angular velocity ω, can be easily obtained by incorporating Equation (11) into the program executed by the processing unit 133.

Further, because the rotation angle of the DC motor 10 in the inertial rotation is obtained based on the angular velocity ω0 immediately before the time point t0, at which the driving of the DC motor 10 is stopped, the time point t1, and the time constant τ of the attenuation of the current i of the DC motor 10, the rotation angle of the DC motor 10 in the inertial rotation can be obtained using the time constant τ of the attenuation of the current i, which can be used instead of the time constant τ of the attenuation of the angular velocity ω.

Additionally, because the rotation angle in the inertial rotation of the DC motor 10 is obtained based on Equation (14), by incorporating Equation (14) into the program executed by the processing unit 133, the rotation angle in the inertial rotation of the DC motor 10 can be obtained using the time constant τ of the attenuation of the current i, which can be used instead of the time constant τ of the attenuation of the angular velocity ω.

Although the rotation angle detecting method, the rotation angle detecting program, and the rotation angle detecting device according to the example embodiments of the present disclosure have been described above, the present disclosure is not limited to the specifically disclosed embodiments, and various modifications and changes can be made without departing from the scope of the claims.

What is claimed is:

1. A rotation angle detecting method comprising:
    measuring a current flowing through a motor; and
    obtaining a rotation angle of the motor based on a value of the measured current;
    wherein the obtaining of the rotation angle of the motor includes obtaining the rotation angle in an inertial rotation of the motor based on a rotational angular velocity of the motor immediately before a first time point, a time period from the first time point to a second time point, and a time period from the second time point to a third time point, and
    wherein the first time point is a time point at which driving of the motor is stopped, the second time point is a time point at which a polarity of the value of the measured current is inverted, and the third time point is a time point at which the value of the measured current becomes zero.

2. The rotation angle detecting method as claimed in claim 1, wherein the obtaining of the rotation angle of the motor includes obtaining the rotation angle in the inertial rotation of the motor, using a value obtained by multiplying the rotational angular velocity of the motor immediately before the first time point by the time period from the first time point to the second time point.

3. The rotation angle detecting method as claimed in claim 1, wherein the obtaining of the rotation angle of the motor includes obtaining the rotation angle in the inertial rotation of the motor, using a value obtained by multiplying the rotational angular velocity of the motor immediately before the first time point by the time period from the second time point to the third time point and a predetermined constant C (C≤0.5).

4. The rotation angle detecting method as claimed in claim 1, wherein the obtaining of the rotation angle of the motor includes obtaining the rotation angle in the inertial rotation of the motor according to an equation (1)

$$\theta = \omega_0 \cdot Tcon + \omega_0 \cdot Tatt \cdot C \qquad (1)$$

wherein θ is the rotation angle in the inertial rotation of the motor, ω0 is the rotational angular velocity of the motor immediately before the first time point, Tcon is the time period from the first time point to the second time point, Tatt is the time period from the second time point to the third time point, and C is a predetermined constant (C≤0.5).

5. The rotation angle detecting method as claimed in claim 4, wherein the obtaining of the rotation angle of the motor includes obtaining the rotation angle in the inertial rotation of the motor according to the equation (1), in response to determining that Tatt is less than a predetermined time threshold.

6. The rotation angle detecting method as claimed in claim 1, wherein the obtaining of the rotation angle of the motor includes obtaining the rotation angle in the inertial rotation of the motor according to an equation (2)

$$\theta = \omega_0 \cdot Tcon + \omega_0 \cdot \tau \qquad (2)$$

wherein θ is the rotation angle in the inertial rotation of the motor, ω0 is the rotational angular velocity of the motor immediately before the first time point, Tcon is the time period from the first time point to the second time point, and τ is a time constant of the attenuation of the current, in response to determining that the time period from the second time point to the third time point is greater than a predetermined time threshold.

7. The rotation angle detecting method as claimed in claim 1,
    wherein the obtaining of the rotation angle of the motor includes:
    measuring a voltage applied to the motor;
    detecting ripples in the current flowing through the motor;
    calculating a rotation angle of the motor based on a number of the detected ripples while a drive voltage is applied to the motor; and
    correcting the number of the ripples based on the value of the measured current and a value of the measured voltage.

8. A non-transitory computer-readable recording medium having stored therein a rotation angle detecting program for causing a computer to perform a process comprising:
    measuring a current flowing through a motor; and
    obtaining a rotation angle of the motor based on a value of the measured current;
    wherein the obtaining of the rotation angle of the motor includes obtaining the rotation angle in an inertial rotation of the motor based on a rotational angular velocity of the motor immediately before a first time point, a time period from the first time point to a second time point, and a time period from the second time point to a third time point, and
    wherein the first time point is a time point at which driving of the motor is stopped, the second time point is a time point at which a polarity of the value of the measured current is inverted, and the third time point is a time point at which the value of the measured current becomes zero.

9. A rotation angle detecting device comprising:
a processor; and
a memory storing program instructions that cause the processor to perform a process comprising:
   measuring a current flowing through a motor; and
   obtaining a rotation angle of the motor based on a value of the measured current;
   wherein the obtaining of the rotation angle of the motor includes obtaining the rotation angle in an inertial rotation of the motor based on a rotational angular velocity of the motor immediately before a first time point, a time period from the first time point to a second time point, and a time period from the second time point to a third time point, and
   wherein the first time point is a time point at which driving of the motor is stopped, the second time point is a time point at which a polarity of the value of the measured current is inverted, and the third time point is a time point at which the value of the measured current becomes zero.

* * * * *